United States Patent [19]

Corbel

[11] Patent Number: 4,535,361
[45] Date of Patent: Aug. 13, 1985

[54] EQUIPMENT FOR THE RETRANSMISSION OF TELEVISION SIGNALS IN A COMMON CHANNEL, WITH AN AUTOMATIC CONTROL OF THE VIDEO/AUDIO RATIO

[75] Inventor: Jean Yves Corbel, Chatou, France

[73] Assignee: LGT, Laboratoire General des Telecommunications, Chatou, France

[21] Appl. No.: 445,750

[22] Filed: Nov. 30, 1982

[30] Foreign Application Priority Data

Dec. 7, 1981 [FR] France ................................ 81 22854

[51] Int. Cl.³ .......................... H04N 5/62; H04N 7/04
[52] U.S. Cl. ..................................... 358/184; 358/174; 358/186
[58] Field of Search ................. 358/184, 143, 83, 142, 358/166, 167, 174, 186, 197, 198; 455/22, 63, 295, 314, 315, 317

[56] References Cited

U.S. PATENT DOCUMENTS

| | | | |
|---|---|---|---|
| 4,081,839 | 3/1978 | Sperver | 358/186 |
| 4,141,041 | 2/1979 | Peters | 358/174 |
| 4,392,252 | 7/1983 | Cluniat | 358/186 |
| 4,434,440 | 2/1984 | Schiff | 358/186 |

Primary Examiner—Tommy P. Chin
Attorney, Agent, or Firm—Cushman, Darby & Cushman

[57] ABSTRACT

The retransmission equipment comprises an automatic control circuit of the video/audio ratio in the television signal. This ARC circuit placed between the intermediate frequency translation mixer and the intermediate frequency amplifier comprises a power distributor between a video channel and an audio channel having respectively a video filter and an audio filter, couplers and an output adder connected to the main outputs of the couplers. The sound channel also has a variable gain amplifier, whose gain is controlled by an error signal, so as to keep the video/audio ratio constant. This error signal results from the comparison of the detected amplitudes of the video and audio components sampled by the couplers in the two channels. This circuit also permits the correction of the cross modulation resulting from non-linearities of amplifiers by the control of the same variable gain amplifier.

3 Claims, 2 Drawing Figures

EQUIPMENT FOR THE RETRANSMISSION OF TELEVISION SIGNALS IN A COMMON CHANNEL, WITH AN AUTOMATIC CONTROL OF THE VIDEO/AUDIO RATIO

BACKGROUND OF THE INVENTION

The invention relates to equipment for the retransmission of television signals in a common channel.

The ratio between the peak amplitude of the video component and the peak amplitude of the audio component modulated in frequency in a composite television signal is defined in place of the transmission. In retransmission equipment, for example in rebroadcasting transmitters, transposers or translators, it is conventional practice to simultaneously amplify in a so-called "common" amplifier chain, the video and audio components of the television signal, automatic gain control loops of the common amplifiers acting simultaneously on the two components.

A television signal transmitted under good conditions, with correct nominal levels for the video and audio components, can undergo selective frequency attenuations as a result of propagation phenomena. These selective attenuations modify the video/audio ratio in the composite signal received by the retransmission equipment. Therefore such equipment is linear and the rebroadcast signals are the image of the signals received.

Retransmission equipment in which the gain of the common amplifiers is controlled from the peak amplitude of the video component will not affect the video/audio ratio which, if it is abnormal at the input, will be retransmitted as it is.

In the same way, retransmission equipment in which the gain of the common amplifiers is controlled on the basis of the sum of the peak amplitudes of the video and audio components, will control a gain modification affecting the two components in the same way, even when the video/audio ratio is abnormal due to the attenuation of one of the components, or will maintain the gain unchanged if the sum of the video and audio peak values is constant, although the video/audio ratio is abnormal.

The only way in which this disadvantage can be obviated is to completely demodulate the signal, restore the levels of the video and audio components, to their nominal values and then rebroadcast them under the same conditions as governed them during their initial transmission. This procedure is complicated and costly.

BRIEF SUMMARY OF THE INVENTION

The present invention relates to retransmission equipment, which solves this problem in an easier manner and which does not require the demodulation and then the remodulation of the signal received.

The present invention therefore relates to equipment for the retransmission of a television signal in a common channel, wherein it comprises an automatic control circuit of the ratio of the peak amplitudes of the video and audio components of the television signal translated into intermediate frequency, said circuit having two separate channels, whose inputs are coupled to the outputs of a power distributor, one of these channels having a filtering circuit for the audio component, while one of these channels also has a variable gain amplifier, the outputs of the two channels being connected to an output adder, the circuit also having at the output of each of these channels, means for sampling the signal, whose outputs are connected to amplitude detectors, the outputs of these detectors being connected to the inputs of a comparator circuit, whose output is coupled to the gain control input of the variable gain amplifier.

BRIEF DESCRIPTION OF THE DRAWINGS

The invention is described in greater detail hereinafter, relative to non-limitative embodiments and with reference to the attached drawings, wherein show.

DETAILED DESCRIPTION OF THE PREFERRED EMBODIMENTS

Figure 1:
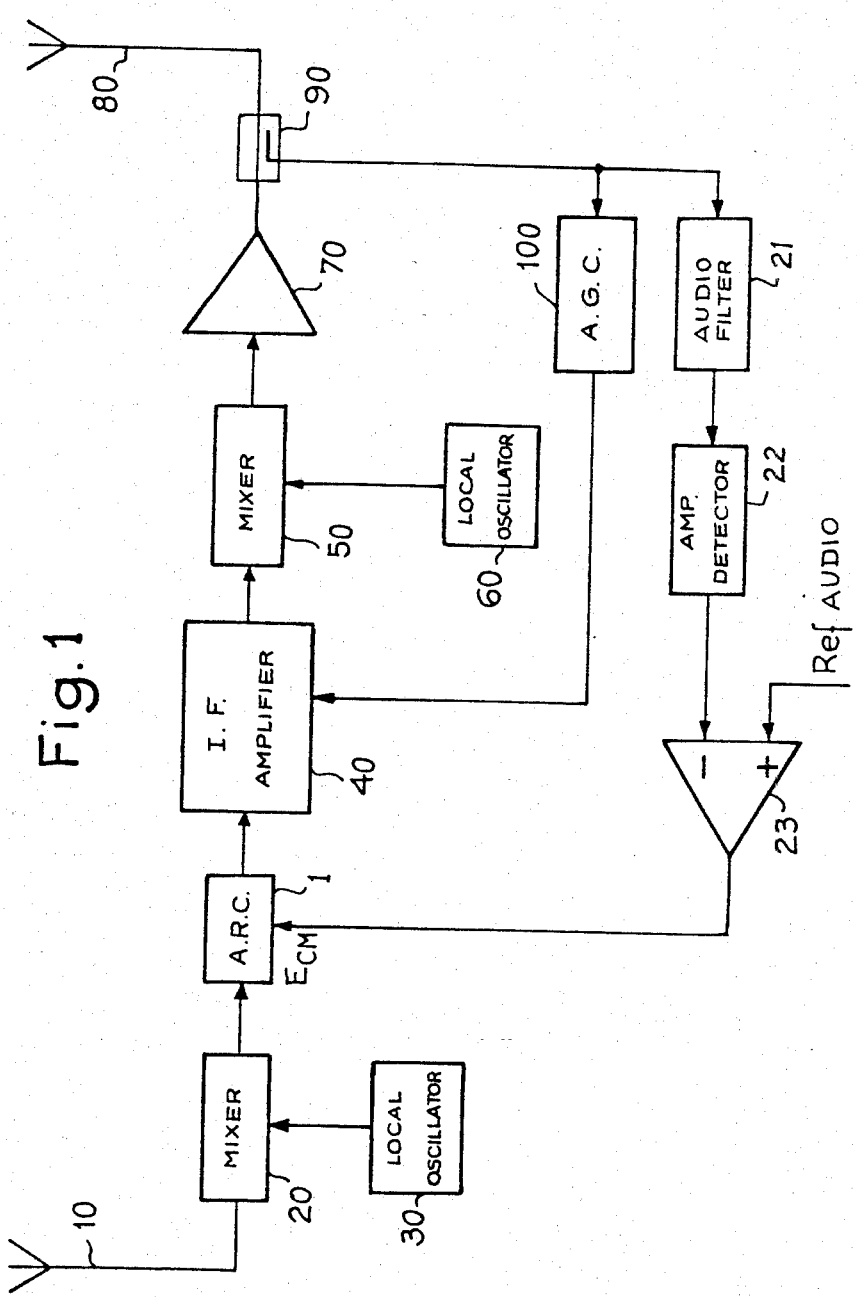
FIG. 1 a block diagram of the retransmission equipment according to the invention.

FIG. 1 shows retransmission equipment of a television signal in a common channel according to the invention, which comprises the conventional elements of an amplifier chain in a common channel and also supplementary elements.

Conventionally a television rebroadcasting transmitter with a common amplification of the audio and the video components comprises a receiving antenna 10, a mixer 20 having one input connected to the antenna and one input connected to the output of a local oscillator 30 for translating the signal received into intermediate frequency. In conventional rebroadcasting transmitters, the output of this mixer is connected to the input of an intermediate frequency amplifier 40, whose output is connected to the first input of a mixer 50 having its other input connected to the output of a local oscillator 60. This mixer retranslates the signal into high frequency. The output of the high frequency mixer 50 is connected to the input of a h.f. output amplifier 70, whose output is connected to the rebroadcasting antenna 80. For the gain control of the intermediate frequency amplifier 40, the rebroadcasting transmitter comprises a coupler 90 which, at the output of the equipment, samples a fraction of the output signal and on the basis thereof is established, by an automatic gain control circuit (AGC) 100, an error signal which is applied to the automatic gain control input of amplifier 40. As a function of the reference signal used as a basis for the automatic gain control, circuit 100 detects the peak amplitude of the video component only, or the peak amplitude of the sum of the video and audio components.

The rebroadcasting transmitter according to the invention also comprises the aforementioned conventional elements, an automatic control circuit 1 of the video/audio ratio, called ARC (Automatic Radio Control Circuit) throughout the remainder of the description and which is located between the intermediate frequency output of mixer 20 and the input of intermediate frequency amplifier 40.

According to the preferred embodiment of the invention, it may also comprise a loop for the correction of the cross modulation signal. This fault, due to the nonlinearity of the amplifiers, is a modulation of the audio signal by the video signal, leading to a residual amplitude modulation on the frequency-modulated audio component. This loop comprises cross modulation detection means comprising an audio filter 21, whose input is connected to the auxiliary output of coupler 90, followed by an amplitude detector 22, whose output is connected to the first input of a differential amplifier 23. The second input of this amplifier receives a signal which is characteristic of the nominal amplitude of the audio signal, ref. AUDIO. The output of this differential amplifier supplies an error signal characteristic of the cross modulation applied to a connection input $E_{CM}$ of the ARC circuit for the automatic control of the video/audio ratio.

Figure 2:
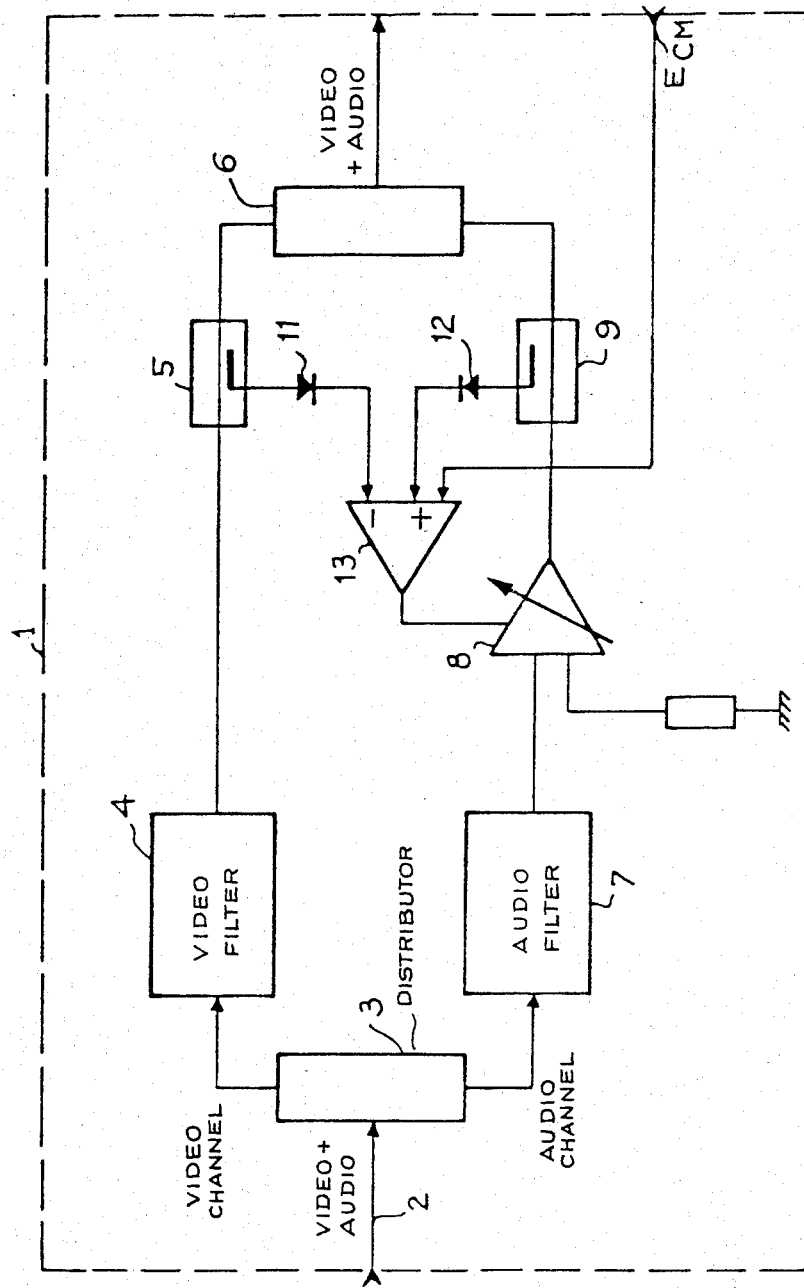
FIG. 2 a block diagram of the automatic control circuit of the video/audio ratio of the equipment.

FIG. 2 shows in detailed form an embodiment of this circuit. Its intermediate frequency input 2 receives the composite signal from mixer 20 (FIG. 1), the video and audio components being superimposed. This input is connected to the input of a distributor 3, whose two outputs form the input of two separate channels, called the video and audio channels, of the ARC circuit. This distributor divides the power available at its input between the two aforementioned channels, the output signals of the distributor always being composite signals. The video channel has an image filter 4 for the selection, in the composite signal, of the video components only. The output of this filter is connected to the input of a coupler 5, whose main output is connected to the first input of an output adder 6. Coupler 5 makes it possible to sample from the video channel, an auxiliary signal characterizing the amplitude of the intermediate frequency video signal.

The audio channel has an audio filter 7, for the selection of the intermediate frequency audio signal from the composite signal present at its input. The output of filter 7 is connected to the signal input of a variable gain amplifier 8. The output of this amplifier is connected to one input of a coupler 9, whose main output is connected to the second input of the output adder 6. Coupler 9 makes it possible to sample from the audio channel, an auxiliary signal characterizing the amplitude of the intermediate frequency audio signal. The video and audio filters 4, 7 must have steep edge characteristics, so that the transmitted signals only have the necessary components, the attenuation of the filter component being at least equal to 40 dB. The filters with conventional LC cells only make it possible to obtain this result with complex and expensive structures, so that the ARC circuit used in the retransmission equipment according to the invention preferably incorporates surface wave filters.

The auxiliary outputs of couplers 5 and 9 are connected to diodes for detecting the peak amplitude of the intermediate frequency audio and video auxiliary signals, respectively 12 and 11. The signals obtained at the output of these detection diodes are applied to the inputs of a differential amplifier 13, whose output is connected to the gain control input of the variable gain amplifier 8. Differential amplifier 13 is such that when the voltages applied to its inputs are within the predefined ratio existing at the transmission point, the error voltage applied to the gain control input of amplifier 8 is zero, this error voltage following the variations of this ratio when it diverges from the predefined value. The variable gain amplifier amplifies to a greater or lesser extent the audio component in order to bring the ratio to the predefined value. Thus, the signal at the output of adder 6, which recombines the two components, i.e. the video component as received and the audio component after correction, still has the same ratio between the peak amplitudes of these two components. This signal can then be amplified in the common channel in the intermediate frequency amplifier 40. The automatic gain control loop of this amplifier, when appropriate, brings the signal to its nominal value, without modifying the video/audio ratio, which retains the correct value.

Thus, the circuit performs the automatic control of the video/audio ratio, without it being necessary to demodulate and then remodulate the received signal to be rebroadcast.

In the embodiment of the equipment comprising a cross modulation correction loop, the differential amplifier comprises a supplementary control input connected to the input $E_{CM}$ of the ARC circuit, to which is applied the error signal characteristic of the cross modulation. This error signal is combined, while having an appropriate amplitude and sign, with the difference signal between the video and audio components in order to carry out a precorrection of the complementary audio component of the cross modulation detected at the output due to non-linearities of the amplifiers.

Thus, the ARC circuit permits simultaneously the automatic control of the video/audio ratio and the correction of cross modulation affecting the audio components, even when the cross modulation level is high. Thus, the equipment makes it possible to correct cross modulation levels of approximately 20%.

The invention is not limited to the embodiments specifically described with reference to the drawings. Particularly in the case of equipment where it is not desired to combine the correction of cross modulation affecting the audio component with the automatic control of the video/audio ratio, it is possible to position the variable gain amplifier 8 in the video channel instead of placing it in the audio channel, as hereinbefore.

What is claimed is:

1. A retransmission device for receiving a television signal and retransmitting a corrected television signal, comprising:
   first mixing means for receiving said television signal and a first local signal and for translating said television signal into an intermediate frequency signal having video and audio components;
   automatic control circuit means coupled to said first mixer and for controlling the video/audio ratio between said video and audio components, said automatic control circuit including,
   (a) a power distributor having two outputs, for dividing the power at its input between said two outputs,
   (b) an audio filter having an input connected to one of said power distributor outputs, for filtering said intermediate frequency audio component signal,
   (c) a video filter having an input connected to the other one of said power distributor outputs, for filtering said intermediate frequency video component signal,
   (d) audio sampling means having an input connected to the output of said audio filter, a main output and an auxiliary output, for sampling said intermediate frequency audio component signal,
   (e) video sampling means having an input connected to the output of said video filter, a main output and an auxiliary output, for sampling said intermediate frequency video component signal,
   (f) first and second detecting means, respectively, connected to said auxiliary outputs of said audio and video sampling means, for respectively detecting the peak amplitude of said intermediate frequency signal audio and video components, (g) adding means connected to said main outputs of said audio and video sampling means for outputting said corrected television signal to be retransmitted, (h) comparing means connected to the outputs of said first and second detecting means for determining whether the video/audio ratio is equivalent to greater than or lesser than a predetermined ratio and outputting a corresponding comparison signal, said video filter and said video sampling means forming a video channel and said audio filter and said audio sampling means forming an audio channel, and (i) a variable gain amplifier connected in any one of said video and audio channels, between said respective filter and sampling means, and having a control input connected to the output of said comparing means, the gain of said variable gain amplifier being adjusted in accordance with said comparison signal;

an amplifier coupled to said automatic control circuit;

a second mixer coupled to said amplifier, for translating the output signal from said amplifier into high frequency; and transmitting means coupled to said second mixer for transmitting said high frequency output signal from said second mixer.

2. A device according to claim 1, wherein said variable gain amplifier is connected in said audio channel, said automatic control circuit means also comprising a cross modulation input coupled to the control input of said variable gain amplifier, said device also comprising a cross modulation correction loop, having an input coupled to the output of said device and an output connected to said cross modulation correction input, said loop comprising cross modulation detection means.

3. Retransmission equipment according to claims 1 or 2, wherein the video and audio filters are surface wave filters.

* * * * *